(12) United States Patent
Visoky et al.

(10) Patent No.: US 11,271,974 B2
(45) Date of Patent: Mar. 8, 2022

(54) SECURELY DEPLOYING SECURITY POLICY AND CONFIGURATION THROUGH NETWORK ADDRESS TRANSLATION SYSTEMS

(71) Applicant: Rockwell Automation Technologies, Inc., Mayfield Heights, OH (US)

(72) Inventors: Jack M. Visoky, Cleveland, OH (US); David E. Huffman, Milwaukee, WI (US); Taryl J. Jasper, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 127 days.

(21) Appl. No.: 16/863,699

(22) Filed: Apr. 30, 2020

(65) Prior Publication Data

US 2021/0344725 A1 Nov. 4, 2021

(51) Int. Cl.
*H04L 29/06* (2006.01)
*H04L 61/25* (2022.01)

(52) U.S. Cl.
CPC .......... *H04L 63/205* (2013.01); *H04L 61/25* (2013.01); *H04L 63/0428* (2013.01); *H04L 63/0876* (2013.01)

(58) Field of Classification Search
CPC .............. H04L 63/205; H04L 63/0428; H04L 63/0876; H04L 61/25
See application file for complete search history.

(56) References Cited

U.S. PATENT DOCUMENTS

| | | | | |
|---|---|---|---|---|
| 2004/0088537 | A1* | 5/2004 | Swander | H04L 63/164 713/153 |
| 2004/0128554 | A1* | 7/2004 | Maher, III | H04L 61/2553 726/11 |
| 2007/0110054 | A1* | 5/2007 | Kozakai | H04L 29/125 370/389 |
| 2009/0215477 | A1* | 8/2009 | Lee | H04W 12/06 455/466 |

(Continued)

OTHER PUBLICATIONS

Visoky, Jack et al., CIP Security Pull Model from the Implementation Standpoint, Oct. 10, 2018, pp. 1-8, https://www.odva.org/Portals/0/Library/Conference/Paper%204_2018-ODVA-Conference_Visoky%20Wiberg_Pull%20Model_FINAL.pdf.

*Primary Examiner* — Vance M Little
(74) *Attorney, Agent, or Firm* — Fletcher Yoder, P.C.

(57) ABSTRACT

A device may include a communication component that may communicatively couple to a first network. The device may also include a processor that may transmit a first signal via the communication component to a network address translation (NAT) system, the first signal including a first request to discover a server device. The NAT system may communicatively couple to the first network and a second network, such that the first network is inaccessible to the second network. The processor may then receive location data associated with the server device and transmit a second signal addressed to the server device based on the location data. The second signal is transmitted to the NAT system, such that the second signal may include a second request for a security policy from the server device. The processor may then receive the security policy via the NAT system and adjust one or more communication operations based on the security policy.

20 Claims, 4 Drawing Sheets

(56) References Cited

U.S. PATENT DOCUMENTS

| | | | |
|---|---|---|---|
| 2010/0094978 A1* | 4/2010 | Runeson | H04L 61/2564 709/221 |
| 2012/0246297 A1* | 9/2012 | Shanker | H04L 41/5064 709/224 |
| 2013/0111043 A1* | 5/2013 | McGuire | H04L 61/2557 709/228 |
| 2019/0327150 A1* | 10/2019 | Hooda | H04L 67/306 |

* cited by examiner

SECURELY DEPLOYING SECURITY POLICY AND CONFIGURATION THROUGH NETWORK ADDRESS TRANSLATION SYSTEMS

BACKGROUND

This disclosure generally relates to systems and methods for deploying security policy and configuration through a network address translation architecture or boundary. More particularly, embodiments of the present disclosure discuss controlling communications from operation technology (OT) devices communicating via a first network to other devices communicatively coupled to each other via a second network.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of actuators, such as valves, electric motors, and so forth, a wide range of sensors, other suitable monitoring devices, or the like, which each may respectively collect data via a variety of sensors. One or more components of the automation control and monitoring systems, such as programming terminals, automation controllers, input/output (I/O) modules, communication networks, human-machine interface (HMI) terminals, and the like, may use the statuses and/or received information in providing alerts to operators, in changing or adjusting operation of one or more components of the industrial automation system (e.g., such as adjusting operation of one or more actuators), in managing the industrial automation system, or the like.

Generally, the networked devices described above may be associated with information, such as different statuses, sensing data, or the like. The information may relate to an operation of the industrial automation system and may be monitored by the automation control and monitoring systems. Certain precautions are taken to operate networked devices in industrial automation systems, such that the transmission of data from these networked devices are controlled and secured. With this in mind, it may be useful to provide improved communication protocols in industrial automation systems.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a device may include a communication component that may communicatively couple to a first network. The device may also include a processor that may transmit a first signal via the communication component to a network address translation (NAT) system, the first signal including a first request to discover a server device. The NAT system may communicatively couple to the first network and a second network, such that the first network may be inaccessible to the second network. The processor may then receive location data associated with the server device and transmit a second signal addressed to the server device based on the location data. The second signal is transmitted to the NAT system, such that the second signal may include a second request for a security policy from the server device. The processor may then receive the security policy via the NAT system and adjust one or more communication operations based on the security policy.

In another embodiment, a non-transitory computer-readable medium may include computer-executable instructions that, when executed, are configured to cause at least one processor to perform operations include transmitting a first signal to a network address translation (NAT) system. The first signal may include a first request to discover a server device, and the NAT system may communicatively couple to the first network and a second network, such that the first network may be inaccessible to the second network. The instructions may also cause the at least one processor to receive location data associated with the server device from the NAT system and transmit a second signal addressed to the server device based on the location data. The second signal may be transmitted to the NAT system, and the second signal may include a second request for a security policy from the server device. The instructions may also cause the processor to receive the security policy via the NAT system, the security policy being stored on the server device. The at least one processor may then adjust one or more communication operations based on the security policy.

In yet another embodiment, a method may include transmitting, via at least one processor, a first signal to a network address translation (NAT) system, such that the first signal may include a first request to discover a server device. The NAT system may communicatively couple to the first network and a second network, such that the first network may be inaccessible to the first network. The method may also include receiving, via the at least one processor, server data associated with the server device from the NAT system and transmitting a second signal addressed to the server device based on the server data. The second signal may be transmitted to the NAT system, such that the second signal may include a second request for a security policy from the server device. The method may also include receiving the security policy via the NAT system, such that the security policy is stored on the server device. The method may then involve adjusting one or more communication operations based on the security policy.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
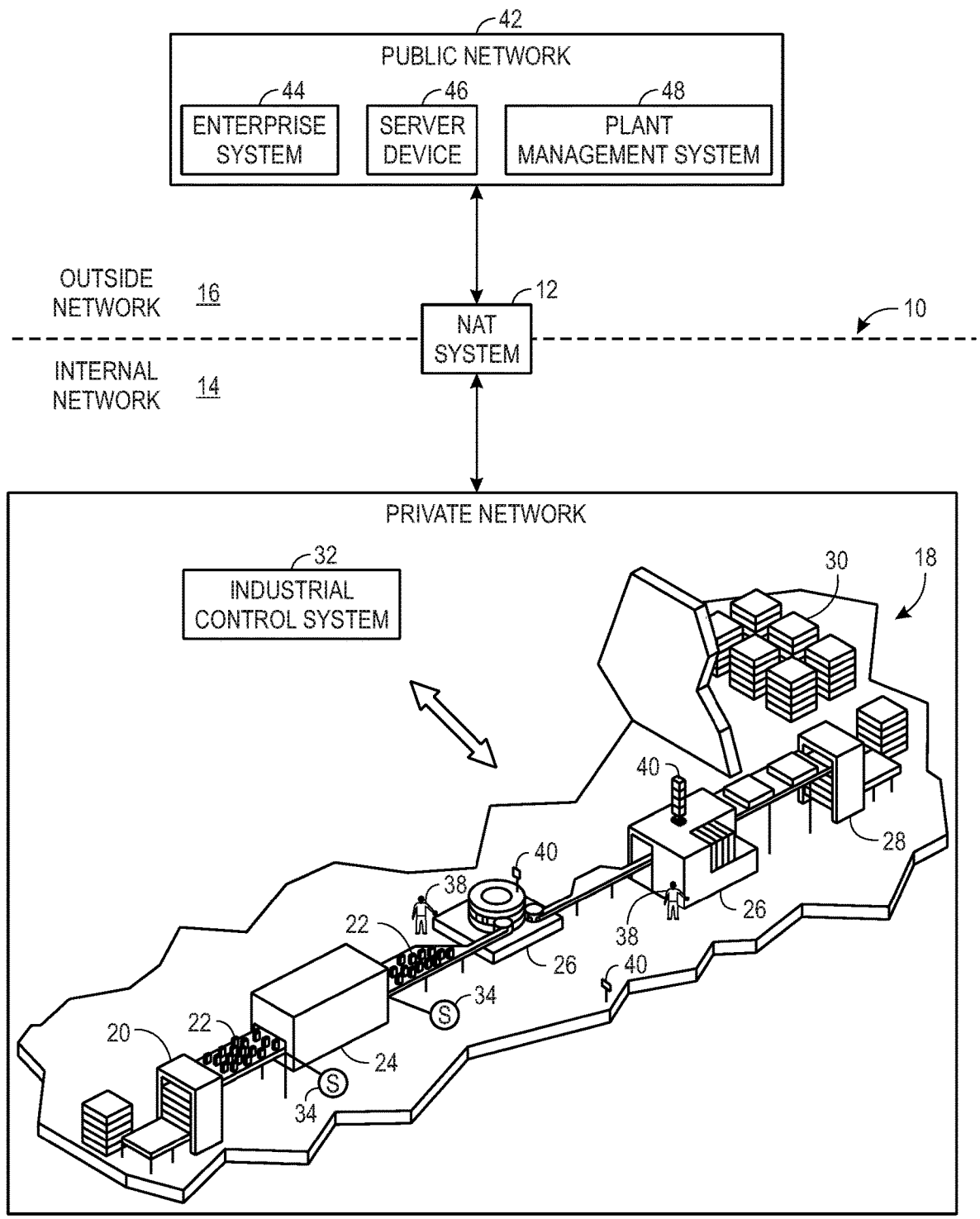
FIG. 1 is a block diagram of network architecture of an example industrial automation system, in accordance with an embodiment.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards controlling communication between devices located between a network address translation (NAT) boundary. In some industrial systems, operation technology (OT) devices (e.g., factory devices associated with OT machines) may communicate with each other via a first network (e.g., private network). To better protect the first network from being accessed by devices in a second network (e.g., public network), a NAT system may map IP addresses from the second network to one in the first network. In this way, the NAT system may control communications to devices in the first network. That is, the NAT system creates a boundary (e.g., NAT boundary) or a firewall between an internal network (e.g., first network) and outside networks (e.g., second network). In some embodiments, the NAT system may be configured to allow only connections that originate from the internal network, thereby protecting the data accessible via the first network from devices attempting to hack or access the data from outside networks.

Although the NAT system may prevent other devices from accessing the internal network, in some cases, the components behind the NAT system (e.g., internal components) may not be provisioned for security since they cannot be reached from outside devices. That is, in some cases, a security or policy server that establishes security protocols and operations for devices in the internal network may have updates that are to be sent to the components behind the NAT system. As a result, the internal components may become vulnerable to security threats or may not send data using the appropriate protocol.

With the foregoing in mind, the present embodiments detail systems and methods for an internal component (e.g., behind the NAT boundary) to discover servers and/or other components that are present on outside networks and coordinating future communications from the servers and/or other components via the NAT boundary. For example, in some embodiments, an internal component may identify itself and broadcast a request to identify devices that are present on the outside network. A server that receives the broadcast request may provide a key or certificate that may be used to authenticate the server. That is, to prevent the internal component from accepting communications from every server that receives the broadcasted request, the key or certificate may include data that enables the internal component to trust the server sending the key or certificate.

After confirming that the server that transmitted the key is to be trusted (e.g., key stored on a trust list), the internal component may send requests for a security policy and/or a secure identity identifying the internal component from the server. Since the requests and identity are sent from the internal component behind the NAT boundary, the server may send the security policy and secure identity via the NAT system in response to the request received via the NAT system. In this way, the NAT system may coordinate communications received from outside the NAT boundary in a controlled fashion to limit the ability of other servers from accessing the internal network. Additional details with regard to implementing a method for coordinating communications between the NAT system will be described below with reference to FIGS. 1-4.

By way of introduction, FIG. 1 is a perspective view of an example network architecture 10 that may include a network address translation (NAT) system 12 for coordinating communications between an internal network 14 and an outside network 16. In some embodiments, within the internal network 14 may include an industrial automation system 18. The industrial automation system 18 may include stations having machine components and/or machines to conduct a particular function within an automated process, for example, a beverage packaging process, as depicted. In the depicted example, the automated process may begin at a station 20 used for loading objects, such as empty cans or bottles to be filled, into the industrial automation system 18 via a conveyor section 22. The conveyor section 22 may transport the objects to a station 24 to perform a first action, for example, washing the empty cans and/or bottles. As objects exit from the station 24, the conveyor section 22 may transport the objects to a station 26, such as a filling and sealing station, in a single-file line. A second conveyor section 22 may transport objects from the station 24 to a station 26. After the objects proceed through the various stations, the objects may be removed from station 28, for example, for storage in a warehouse 30. Clearly, for other applications, the particular system, machine components, machines, stations, and/or conveyors may be different or specially adapted to the application.

For example, the industrial automation system 18 may include machinery to perform various operations in a compressor station, an oil refinery, a batch operation for making food items, a mechanized assembly line, and so forth. Accordingly, the industrial automation system 18 may include a variety of operational components, such as electric motors, valves, actuators, temperature elements, pressure sensors, or a myriad of machinery or devices used for manufacturing, processing, material handling, and other applications.

Additionally, the industrial automation system 18 may include various types of equipment that may perform the various operations as part of an industrial application. For instance, industrial automation system 18 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 18 may also include motors, protection devices, switchgear, compressors, and the like.

In certain embodiments, one or more properties of the industrial automation equipment, such as the station 20, may be monitored and controlled by an industrial control system 32 for regulating control variables. For example, sensing devices (e.g., sensors 34) may monitor various properties of the industrial automation system 18 and may be used in adjusting operations of the industrial automation system 18. In some cases, the industrial automation system 18 may be associated with devices used by other equipment. For instance, scanners, gauges, valves, flow meters, and the like may be disposed on the industrial automation system 18. Here, the industrial control system 32 may receive data from the associated devices and use the data to perform their respective operations more efficiently. For example, a controller of the industrial automation system 18 associated with a motor drive may receive data regarding a temperature of a connected motor and may adjust operations of the motor drive based on the data.

The industrial control system 32 may be communicatively coupled to a display/operator interface (e.g., an HMI) and to devices of the industrial automation system 18. Although one industrial control system 32 is depicted, it should be understood that any suitable number of industrial control systems 32 may be used in a particular industrial automation system 18 embodiment. The industrial control system 32 may represent components of the industrial automation system 18 through programming objects that may be instantiated and executed to provide simulated functionality similar or identical.

The sensors 34 may be any device adapted to provide information regarding process conditions. Indeed, the sensors 34 may be used in a process loop monitored and controlled by the industrial control system 32. As such, a process loop may be activated based on process inputs (e.g., an input from the sensor 34) or direct input from a person 38 via the display/operator interface of the industrial control system 32. The person 38 operating and/or monitoring the industrial automation system 18 may reference the display/operator interface to determine various statuses, state, and/or current operations of the industrial automation system 18 and/or for a particular component. Furthermore, the person operating and/or monitoring the industrial automation system 18 may adjust to various components to start, stop, power-down, power-on, or otherwise adjust an operation of one or more components of the industrial automation system 18 through interactions with control panels or various input devices.

The industrial control system 32 may use networked devices 40 in managing operation of the industrial control system 32. The networked devices 40 may be any suitable device within the industrial automation system 18 that communicates a status, a data packet, an alert, or the like, to the industrial control system 32 and/or other networked devices 40. For example, the networked device 40 may be processing circuitry coupled to an example sensor 34 that enables the sensor 34 to transmit sensing data to the industrial control system 32. As an additional example, the network of the industrial control system 32 may enable communication between an example networked device 40 including the sensor 31 and another networked device 40 that controls an operation of a component (e.g., motor, valve) based on data packets generated via the sensor 34.

The internal network 14 of the industrial control system 32 may be a wired network, a wireless network, and/or a combination of the two. Some addressing between networked devices 40 may be implicit, such as is the case in wired networks. However, in wireless networks, a networked device 40 may use a unique address to communicate via the network. The unique address may include information at least identifying that a particular transmission originated from the networked device 40 within the internal network 14. The unique address may be associated with a data packet to help the industrial control system 32 transmit the data packet between networked devices 40.

As mentioned above, the internal network 14 may be accessible via the NAT system 12. The NAT system 12 may be a router, a firewall, a computing device, or any suitable component for performing network address translation operations and controlling the communication between the internal network 14 and the outside network 16. The NAT system 12 may control access to the variety of components that make up the industrial automation system 18 to limit access to data indicative of the current operation, limit access to control operations of the various equipment in the industrial automation system 18, and the like. To control the communication, the NAT system 12 may route data only from internal components of the internal network 14. That is, the NAT system 12 may not allow communications to be received from the outside network 16, but it may allow communications to be sent to the outside network 16 from the internal network 14.

By way of example, the outside network 16 may include a public network 42 that is accessible by a variety of devices via the Internet or any suitable wide-area network. In some embodiments, the public network 42 may include an enterprise system 44, a server device 46, a plant management system 48, and the like. The enterprise system 44 may include software and/or hardware components that support business processes, information flows, reporting, data analytics, and the like. The server device 46 may include any suitable server computing device. In one embodiment, the server device 46 may include a security policy server that may manage the communications between devices in the outside network 16. That is, the security policy may include provisions or instructions that detail how the communication between devices are to be performed. As such, the server device 46 may implement a security policy related to centrally managing communications between devices. The security policy may include identification data or information for devices or endpoints that are to be trusted, information regarding which communication ports to use, a process for updating a security policy, and the like.

The server device 46 may deliver the security policy as a signed document to devices in the internal network 14, the outside network 16, or both. The signed document may include a digital certificate or a digital signature that certifies the ownership or authenticity of the related document. The digital certificate or digital signature may be implemented using any suitable cryptography scheme. In some embodiments, the server device 46 may provide a unique cryptographic identity that may be unique to a particular device or endpoint. The identity provided to the device may be used to authenticate future communications from the device and facilitate secure communications with the server device 46.

The plant management system 48 may include any suitable management computing system that receives data from a number of control systems (e.g., industrial control system 32). As such, the plant management system 48 may track operations of a variety of facilities in various locations. In addition, the plant management system 48 may issue control commands to the devices in the internal network 14. However, since the internal network 14 is positioned behind the NAT system 12, the devices located in the internal network 14 may not receive the commands from the plant management system 48 without employing some of the techniques described herein.

Figure 2:
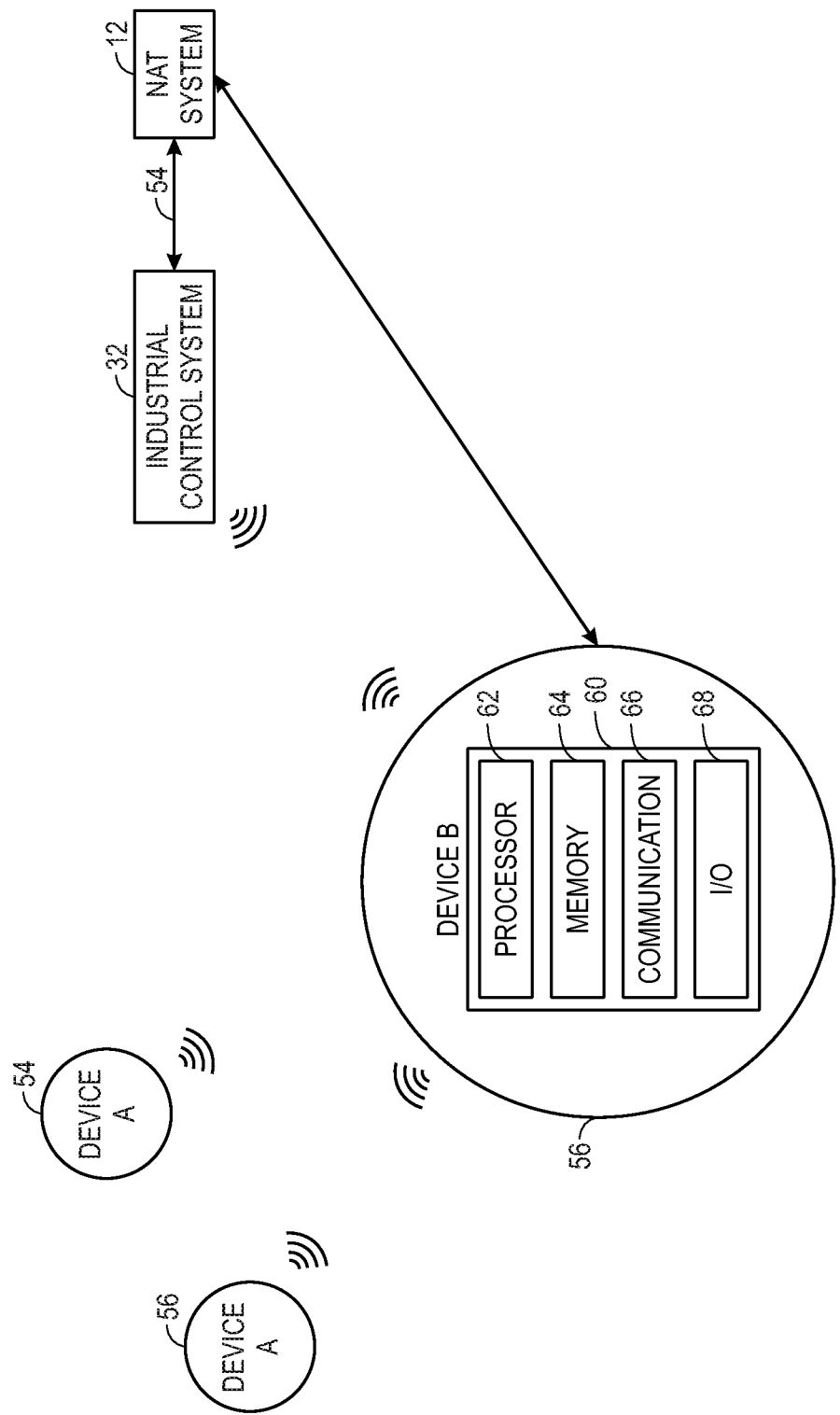
FIG. 2 is a block diagram of an example device of the network architecture of FIG. 1, in accordance with an embodiment.

Keeping the forgoing in mind, FIG. 2 is a block diagram of three networked devices 52, 54, and 56 of the industrial automation system 18 that communicate with the industrial control system 32, such that the NAT system 12 controls communications between the internal network 14 and the outside network 16. As used herein, the network devices 52, 54, and 56 may include network device 40 of FIG. 1 and/or any other suitable status or information emitting device that communicates via the internal network 14.

The network devices 52, 54, 56, the industrial control system 32, the NAT system 12, the industrial control system 32, the enterprise system 44, the server device 46, the plant management system 48, and any other suitable devices may each include processing circuitry 60 including a processor 62, a memory 64, a communication component 66, input/output (I/O) ports 68, or the like. The processor 62 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 62 may, in some embodiments, include multiple processors. The memory 64 may include any suitable articles of manufacture that serve as media to store processor-executable code, data, or the like. The memory 64 may store processor-executable code, that when executed, cause the processor 62 to perform the presently disclosed techniques.

The communication component 66 may be a wireless or a wired communication component that may facilitate communication between the network device 56 and other network devices 52 and 54, machines having communication functionalities, components having communication functionalities, and/or the industrial control system 32 via the internal network 14. For example, the communication component 66 may be a radio and/or include one or more radios (e.g., integrated radios of the networked device 40). The networked device 56 via the communication component 66 may communicate using any suitable communication protocol include ultra-wide band wireless radio technology that includes both communication and location functionalities within components of the radios (e.g., integrated communication-location functionalities), wired or wireless communication protocols may include any (or use any) suitable communication protocol including Wi-Fi, mobile telecommunications technology (e.g., 2G, 3G, 4G, long term evolution (LTE) enabled devices, 5G), Bluetooth®, near-field communications technology, and the like. The communication component 66 may include a network interface to enable communication via various protocols such as EtherNet/IP®, ControlNet®, DeviceNet®, or any other industrial communication network protocol.

In general, the network devices 52, 54, and 56 may correspond to any component that makes up the industrial automation system 18. In addition, these devices may communicate with the industrial control system 32, which may coordinate communications to the NAT system 12, or directly to the NAT system 12. In any case, the NAT system 12 may control communications to devices in the internal network 14, such that the devices do not receive data or communications from devices in the outside network 16. With this in mind, it should be noted that security servers (e.g., server device 46) are often positioned in the outside network 16. Indeed, for industrial systems, devices in the internal network 14 may correspond to operation technology (OT) devices that monitor or alter states of machines or components that perform operations in the industrial automation system 18. In some cases, the OT devices may communicate between each other within the internal network 14 using certain communication protocols that may not be as secure as devices that operate in the outside network 16. As such, the NAT system 12 may prevent the OT devices from receiving communications from the outside network 16 to limit their exposure to security risks (e.g., hacking attempts).

Keeping this in mind, the devices in the internal network 14 may still benefit from coordinating its communication operations according to a security policy. As such, as mentioned above, the server device 46 may provide a security policy to the devices in the internal network 14, such that the devices can communicate with other devices in a secure manner. That is, the server device 46 may issue a security policy to the devices in the internal network 14 that defines communication ports to use for communication, cypher suites that may be used encryption, and the like. In this way, data communicated to the outside network 16 from the devices in the internal network 14 may be secure.

To enable the devices in the internal network 14 to receive security policy data and updates, the network device 56 or other devices in the internal network 14 may broadcast a request to discover a security policy server or other suitable server. The request may be sent to the NAT system 12, which may distribute the request across the outside network 16. The server device 46 may receive the request and send a data identifying the server device 46 to the NAT system 12 in response to receiving the request. Since the NAT system 12 is receiving a response to the request that was sent from the network device 56, the NAT system 12 may allow the response to be sent to the network device 56. That is, the NAT system 12 may translate the network address of the received response to a network address that corresponds to the network device 56 that sent the original request. After receiving the identification information for the server device 46 and its location data, the network device 56 may request security policy data and other information from the server device 46 by initiating communications to the server device 46 via the NAT system 12. Additional details with regard to coordinating communications between devices in the internal network 14 and the outside network 16 via the NAT system 12 will be discussed below with reference to FIGS. 3 and 4.

Figure 3:
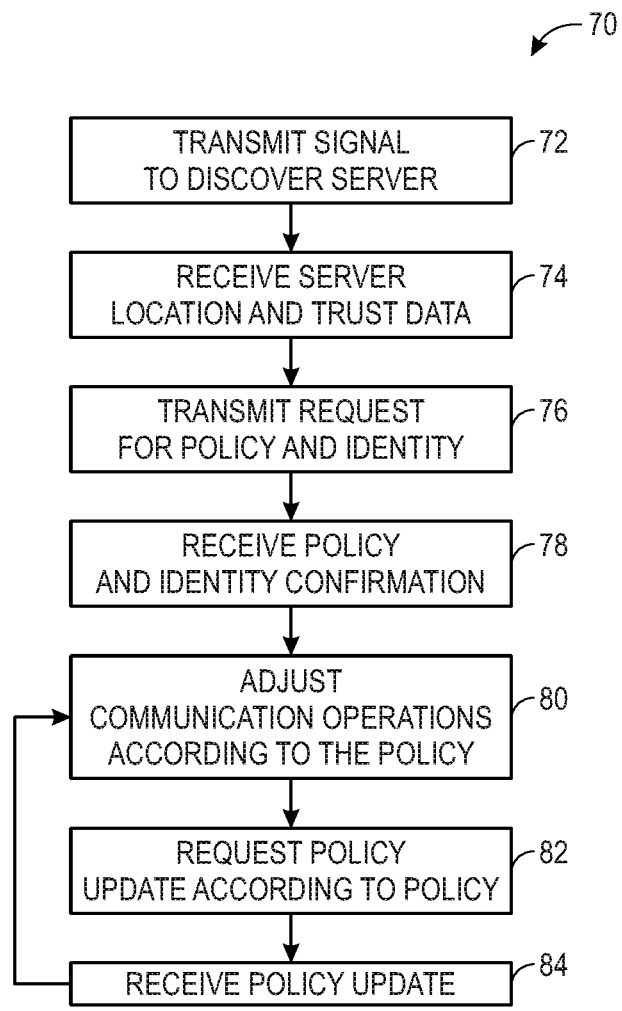
FIG. 3 is a flow chart of a method for controlling communications between a network address translation (NAT) boundary, in accordance with an embodiment.
Figure 4:
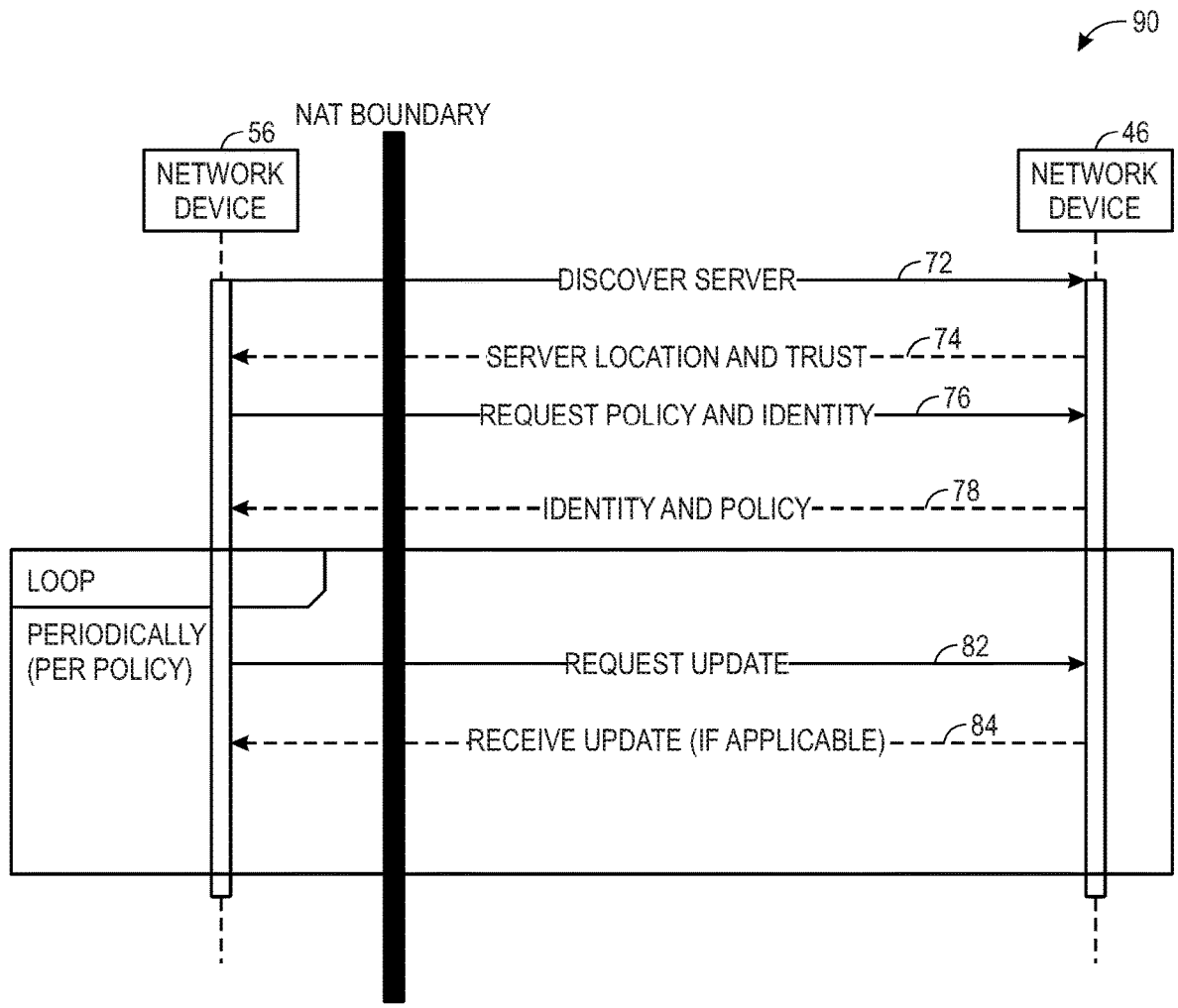
FIG. 4 is a sequence diagram representative of the flowchart depicted in in FIG. 3, in accordance with an embodiment.

With this in mind, FIG. 3 illustrates a flowchart of a method 70 for controlling communication operations of the network device 56 based on a security policy received from the server device 46. In addition, the flowchart of FIG. 3, FIG. 4 illustrates a sequence diagram 90 that represents the method 70. As such, the discussion of the method 70 will be supplemented with references to corresponding portions of the sequence diagram 90.

Before continuing, it should be noted that although the following description of the method 70 is described as being performed by the network device 56, the method 70 may be performed by any suitable device in the internal network 14. In addition, though the method 70 is described in a particular order, it should be understood that the method 70 may be performed in any suitable order. In addition, it should be noted that the following description of the method 70 involves communications between the internal network 14 and the outside network 16. Each communication between these two networks is facilitated via the NAT system 12. That is, although the description of the communication may be described as being transmitted and received between the server device 46 and the network device 56, each of the communications is coordinated through the NAT system 12.

Referring now to FIG. 3, at block 72, the server device 56 may transmit a signal to the NAT system 12 to discover a security policy server. In some embodiments, the server device 46 may operate as a security policy server, as mentioned above. As such, the NAT system 12, after receiving the signal requesting to discover the security server, may broadcast the request to a number of devices in the outside network 16. In some embodiments, the NAT system 12 may send the request to known internet protocol (IP) addresses. The request may cause the devices that receive the signal to forward the request to other known IP addresses. In some embodiments, the NAT system 12 or other device that receives the request may send the request across a spectrum of addresses, communication ports, or the like.

After receiving the request from the network device 56, the server device 46 may send a response packet that includes information regarding the location (e.g., IP address) of the server device 46 and trust information regarding the server device 46. The trust information may include some a priori trust data that the network device 56 may recognize. That is, the trust information may include data (e.g., private key, certificate, known data pattern) expected to be received by the network device 56 from the server device 46. As such, the trust information may be preprogrammed or stored in the network device 56. Alternatively, the trust information may include a digitally signed certificate that the network device 56 may decode using a public or private key. It should be noted that the verification of the trust information provided by the server device 56 is not limited to the methods discussed above, and it should be understood that other suitable methods for verifying the trust information provided by the server device 46 may be used.

At block 74, the network device 56 may receive the location data and the trust information regarding the server device 46 via the NAT system 12. After verifying the trust data, the network device 56 may proceed to block 76 and transmit a request for a security policy along with a secure identity for the network device 56 to be recognized by the server device 46. In some embodiments, the network device 56 may transmit a request for a security policy along with a secure identity for the network device 56 after authenticating the trust data received from the server device 46. The secure identity may be encrypted, such that the server device 46 may be capable of decrypting the information. In some embodiments, the secure identity may be used by the server device 46 to send data back to the network device 56 via the NAT system 12, such that the NAT system 12 may identify the network device 56 from the devices in the internal network 14. Indeed, communications received by the NAT system 12 that do not include the secure identity may be discarded and blocked by the NAT system 12. In some embodiments, the secure identity may include default credential data that the server device 46 may use to authenticate the network device 56.

After receiving the request for the security policy and the secure identity of the network device 56, the server device 46 may send the security policy and a confirmation of the secure identity to the network device 56. As such, at block 78, the network device 56 may receive the security policy and the confirmation of the secure identity. As discussed above, the security policy may provide information related to how the network device 56 is expected to perform communication operations. For example, the security policy may provide information such as additional trust anchors, access policy specifications, user role and Group information, Expiration information, and the like. The communication operations may include specifying communication ports to use, cipher suites to encrypt and decrypt data, initialization protocols, and the like. In some embodiments, the components of the outside network 16 may include information technology (IT) components that operate using certain security protocols. OT components that may make up the network devices 52, 54, and 56 may not have the circuitry or software to request and implement security policies.

With this in mind, in some embodiments, the NAT system 12 may facilitate routing the security policy data to the network device 56 without modifying the operations of the network device 56. Indeed, the NAT system 12 may serve as an intermediary between the network device 56 and the server device 46 (or any other suitable component in the outside network 16), such that the NAT system 12 may modify communications sent to the server device 46 to conform to the communication protocol specified by the security policy.

Referring back to FIG. 3, at block 80, the network device 56 may adjust communication operations according to the received security policy. That is, communications between network devices 52, 54, and 56 may be implemented in accordance with the security policy specified by the server device 46. In some embodiments, the NAT system 12 may provide the security policy information to the network device 56 in a native format or programming code, such that the network device 56 may accurately interpret and implement the communication protocol changes.

After adjusting the communication operations according to the security policy, the network device 56 may communicate with other devices in accordance with the security policy. To ensure that the network device 56 continues to update its communication operations as the security policy is updated, the network device 56 may periodically request policy updates from the server device 56, at block 82. In some embodiments, the security policy received from the server device 56 may include a periodic schedule (e.g., weekly, monthly) or may specify certain dates and/or times in which the server device is to be queried for security policy updates. As such, the network device 56 may send a security policy update request in accordance with the communication protocol defined by the received security policy to the server device 56 via the NAT system 12. If an update is available, the network device 56 may, at block 84, receive the updated security policy from the server device and return to block 80 to adjust its communication operations in accordance to the updated security policy.

Thus, technical effects of the present disclosure include techniques for assisting in integrating communication protocols between OT components and IT components. Indeed, devices positioned behind the NAT boundary may be unable to retrieve information from devices in the outside network 16. The present embodiments described herein provide a method for securely retrieving information from devices in the outside network 16 from a device in the internal network 14. Moreover, the internal components may send requests for information from unknown devices. That is, the internal component does not need to have access to predefined authorities or server devices to retrieve information. Indeed, OT components are often manufactured by one entity but implemented for use by another entity. This second entity generally establishes the security policy or other relevant protocol. As such, the present embodiments described herein enable internal components (e.g., OT components) to retrieve a security policy from any entity without using a predefined server location in the outside network 16. Moreover, the internal components may retrieve security policies and security policy updates automatically, while maintaining secure communications via the NAT system 12. That is, since the communications to the server device 46 are always routed through the NAT system 12, the internal network 14 may be secure from attempts to access the devices in the internal network 14, while maintaining the ability to seek information from devices in the outside network 16.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A device, comprising:
a communication component configured to communicatively couple to a first network; and
a processor configured to:
transmit a first signal via the communication component to a network address translation (NAT) system, wherein the first signal comprises a first request to discover a server device, and wherein the NAT system is configured to communicatively couple to the first network and a second network, wherein the first network is inaccessible to the second network;
receive location data associated with the server device from the NAT system;
transmit a second signal addressed to the server device based on the location data, wherein the second signal is transmitted to the NAT system, and wherein the second signal comprises a second request for a security policy from the server device;
receive the security policy via the NAT system, wherein the security policy is stored on the server device; and
adjust one or more communication operations based on the security policy.

2. The device of claim 1, wherein the processor is configured to receive trust data along with location data via the NAT system, wherein the trust data is associated with the server device.

3. The device of claim 2, wherein the trust data corresponds to a set of data stored in a memory of the device.

4. The device of claim 2, wherein the trust data comprises a private key, a certificate, expected data, or any combination thereof.

5. The device of claim 2, wherein the processor is configured to transmit the second signal in response to authenticating the server device based on the trust data.

6. The device of claim 1, wherein the security policy comprises one or more provisions for performing the one or more communication operations.

7. The device of claim 1, wherein the second signal comprises a secure identity representative of the device.

8. A non-transitory computer-readable medium comprising computer-executable instructions that, when executed, are configured to cause at least one processor to perform operations comprising:
transmitting a first signal to a network address translation (NAT) system, wherein the first signal comprises a first request to discover a server device, and wherein the NAT system is configured to communicatively couple to the first network to a second network inaccessible, wherein the first network is inaccessible to the second network;
receiving location data associated with the server device from the NAT system;
transmitting a second signal addressed to the server device based on the location data, wherein the second signal is transmitted to the NAT system, and wherein the second signal comprises a second request for a security policy from the server device;
receiving the security policy via the NAT system, wherein the security policy is stored on the server device; and
adjusting one or more communication operations based on the security policy.

9. The non-transitory computer-readable medium of claim 8, wherein the computer-executable instructions are configured to cause the at least one processor to transmit a third signal to the server device via the NAT system, wherein the third signal comprises an additional request for an update to the security policy.

10. The non-transitory computer-readable medium of claim 9, wherein the security policy is indicative of a time to transmit the third signal.

11. The non-transitory computer-readable medium of claim 9, wherein the computer-executable instructions are configured to cause the at least one processor to perform the operations comprising sending the third signal to the server device via the NAT system periodically.

12. The non-transitory computer-readable medium of claim 9, wherein the security policy is indicative of a periodic schedule to send the third signal.

13. The non-transitory computer-readable medium of claim 8, wherein the computer-executable instructions configured to cause the at least one processor to adjust the one or more communication operations comprises transmitting data via one or more communication ports, encrypting data using one or more cypher suites, implementing one or more initialization protocols, or any combination thereof.

14. The non-transitory computer-readable medium of claim 8, wherein the computer-executable instructions are configured to perform the operations comprising receiving trust data along with location data via the NAT system, wherein the trust data is associated with the server device.

15. A method, comprising:
transmitting, via at least one processor, a first signal to a network address translation (NAT) system, wherein the first signal comprises a first request to discover a server device, and wherein the NAT system is configured to communicatively couple to the first network and a second network inaccessible to the first network;
receiving, via the at least one processor, server data associated with the server device from the NAT system;
transmitting, via the at least one processor, a second signal addressed to the server device based on the server data, wherein the second signal is transmitted to the NAT system, and wherein the second signal comprises a second request for a security policy from the server device;
receiving, via the at least one processor, the security policy via the NAT system, wherein the security policy is stored on the server device; and
adjusting, via the at least one processor, one or more communication operations based on the security policy.

16. The method of claim 15, comprising transmitting a third signal to the server device via the NAT system, wherein the third signal comprises an additional request for an update to the security policy.

17. The method of claim 16, wherein the security policy is indicative of a time to send the third signal.

18. The method of claim 16, comprising transmitting the third signal to the server device via the NAT system periodically.

19. The method of claim 16, comprising receiving the update to the security policy via the NAT system.

20. The method of claim 19, comprising adjusting the one or more communication operations based on the update.

* * * * *